United States Patent [19]

Silfvast et al.

[11] 4,336,506
[45] Jun. 22, 1982

[54] SEGMENTED PLASMA EXCITATION-RECOMBINATION LASER

[75] Inventors: William T. Silfvast, Holmdel; Leo H. Szeto, Howell, both of N.J.; Obert R. Wood, II, New York, N.Y.

[73] Assignee: Bell Telephone Laboratories, Incorporated, Murray Hill, N.J.

[21] Appl. No.: 82,308

[22] Filed: Oct. 5, 1979

[51] Int. Cl.³ .............................................. H01S 3/093
[52] U.S. Cl. ........................................ 372/62; 372/56; 372/76; 372/87
[58] Field of Search ................ 331/94.5 PE, 94.5 G, 331/94.5 P

[56] References Cited

U.S. PATENT DOCUMENTS

| | | | |
|---|---|---|---|
| 3,619,812 | 11/1971 | Asmos | 331/94.5 |
| 3,891,941 | 6/1975 | Roberts et al. | 331/94.5 |
| 4,041,414 | 8/1977 | Richardson et al. | 331/94.5 PE |
| 4,295,103 | 10/1981 | Yudmirsky | 331/94.5 PE |

OTHER PUBLICATIONS

"Large Aperture $CO_2$ Laser Discharges", 6, Richardson et al., *IEEE Jour. Quant. Elect.*, vol. AE-9, No. 9, Sep. 1973.

"Attainment of a Homogeneous Discharge in a Large-Volume Pulse $CO_2$ Laser", Baranov et al., *Sov. J. Quant. Elect.*, vol. 5, No. 9, 1976.

"Recombination Lasers in Expanding $CO_2$ Laser Produced Plasmas of Argon, Krypton and Xenon", by Silfvast et al., *App. Phys. Lett.*, vol. 31, No. 5, 1977.

"Ultra-High-Gain Laser Produced Plasma Laser in Xenon Using Periodic Pumping", by Silfvast et al., *App. Phys. Lett.*, vol. 34, No. 3, Feb. 1979.

"Recombination Lasers in Nd and $CO_2$ Lasor-Produced Cadmium Plasmas", by Silfvast et al., *Optics Lett.*, vol. 4, No. 9, Sep. 1979.

*Primary Examiner*—James W. Davie
*Assistant Examiner*—Léon Scott, Jr.
*Attorney, Agent, or Firm*—Michael B. Einschlag; Daniel D. Dubosky

[57] ABSTRACT

A high-voltage, high current pulse is applied to a series of two or more conducting strips (101-110) installed in series in a laser cavity (150-151) containing either a buffer gas or a vacuum. The strips are separated by small gaps. When the high-voltage, high-current pulse is applied to the strips, plasmas (141-149) are formed in the gap regions. The plasmas are comprised of ions from the strip material. Once formed, these plasmas expand hemispherically, cool and recombine to provide laser action. The composition of the plasmas depends on the strip material, the electric field in the gaps, the gap size and the background gas type and pressure.

11 Claims, 2 Drawing Figures

SEGMENTED PLASMA EXCITATION-RECOMBINATION LASER

BACKGROUND OF THE INVENTION

The invention relates to the field of lasers and more particularly to the field of plasma excitation-recombination lasers.

Applicants have demonstrated that recombination lasers could be generated in the recombining plasma of a laser-vaporized metal (Cd) by use of the relatively low energy (as low as 0.5 mJ) output of focused lasers. This work was documented in an article entitled, "Recombination Lasers in Nd and $CO_2$ Laser-Produced Cadmium Plasmas", by W. T. Silfvast, L. H. Szeto and O. R. Wood II, *Optics Letters*, September, 1979, Vol. 4, No. 9, pp. 271-273. This result was obtained by allowing the laser-produced plasma of the target material to expand into a low pressure background gas which provided control of the plasma expansion and increased the electron cooling rate, thereby increasing the recombination rate. Further work by applicants has indicated that segmentation of the plasma in the focal region where it is produced by cylindrical focusing is significantly more effective in generating a recombination laser in xenon gas than is the generation of the plasma by a continuous line focus. A 24-fold increase in Xe laser output was obtained for the segmented focus plasma as compared to the continuous line focus plasma for the same input energy. This increase was attributed to the larger volume of cool gas surrounding the plasmas which allowed greater plasma expansion and thereby increased the plasma recombination rate. This work was documented in an article entitled, "Ultra-High-Gain Laser-Produced Plasma Laser in Xenon Using Periodic Pumping" by N. T. Silfvast, L. H. Szeto and O. R. Wood II, *Applied Physics Letters*, Vol. 34, No. 3, Feb. 1, 1979, pp. 213-215.

SUMMARY OF THE INVENTION

A high-voltage, high current pulse is applied to a series of two or more conducting strips installed in series in an enclosure containing a laser cavity and either a buffer gas or a vacuum. The strips are separated by small gaps. When the high-voltage, high-current pulse is applied to the strips, plasmas are formed in the gap regions. The plasmas are comprised of ions from the strip material. Once formed, these plasmas expand hemispherically, cool and recombine to provide laser action. The composition of the plasmas depends on the strip material, the electric field in the gaps, the gap size and the background gas type and pressure.

BRIEF DESCRIPTION OF THE DRAWING

A complete understanding of the present invention may be gained from a consideration of the following detailed description presented hereinbelow in connection with the accompanying drawings in which.

DETAILED DESCRIPTION

Figure 1:
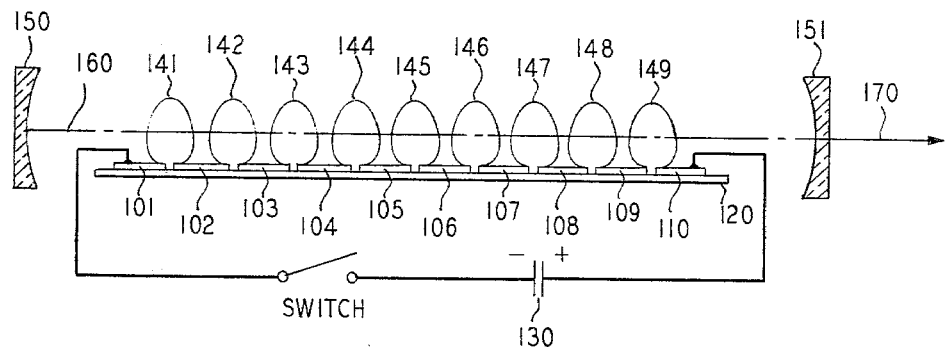
FIG. 1 shows, in schematic form, an embodiment of the present invention utilizing Cd metal strips.

An embodiment of the present invention used for the production of a segmented plasma-excitation and recombination (SPER) laser in Cd vapor is shown in FIG. 1. Ten cadmium strips 101-110, each being 1 mm thick by 2 mm wide by 10 mm long, were positioned end to end on a 6 inch long glass plate, 120, in such a manner as to leave a 1 mm gap between each pair of strips. This electrode arrangement was then installed in a gas cell, (not shown in FIG. 1). Capacitor 130, 0.01 $\mu$F, was charged to 21 kV and then discharged across the series of metal strips with a spark gap. The resultant 840 A current pulse had a ringing frequency of 1.2 MHz and produced a bright metal vapor plasma in each gap. Areas 141-149 in FIG. 1 depict the shape of the plasmas after they had expanded hemispherically outward from the gaps into a background gas of helium at 5 Torr. The areas depicted correspond to a 1 cm diameter volume. The appearance of each individual plasma was found to be similar to that produced by the focused output from pulsed Nd or $CO_2$ lasers on Cd targets.

Two dielectric mirrors, 150 and 151, coated for maximum reflectivity between 1.35 and 1.53 $\mu$m and having a 3 meter radius of curvature formed a 9 inch long resonator for the 1.43 $\mu$m laser radiation. The optical axis, 160, of this resonator was positioned parallel to and 7 mm above the row of cadmium strips. The output from this resonator, shown as arrow 170, was focused through suitable filters onto a room temperature Ge diode.

Glass plate 120 is not essential to operation of the laser. In fact, glass plate 120 can be eliminated without significantly affecting the laser output. It does, however, function as a structural support for the electrodes and can control the direction of plasma expansion to some extent.

Using a similar arrangement to that shown in FIG. 1, we have made SPER lasers in the near infrared at wavelengths between 0.94 and 1.84 $\mu$m in the eight elements listed in Table I. The table also lists the observed wavelengths, the transition assignment and the relative power outputs for these elements. The measured wavelengths have been identified with a transition in the neutral spectrum of the element. In every case the oscillating transitions occur between levels immediately above and below energy gaps in the excited states of the neutral species. To our knowledge laser action has not been observed before in the neutral spectra of Mg, Zn and In. Note that to produce laser oscillation in materials other than cadmium using the arrangement shown in FIG. 1, one merely replaces the cadmium strips with strips of other materials and provides the laser resonator with mirrors having high reflectivity at the appropriate wavelengths.

Figure 2:
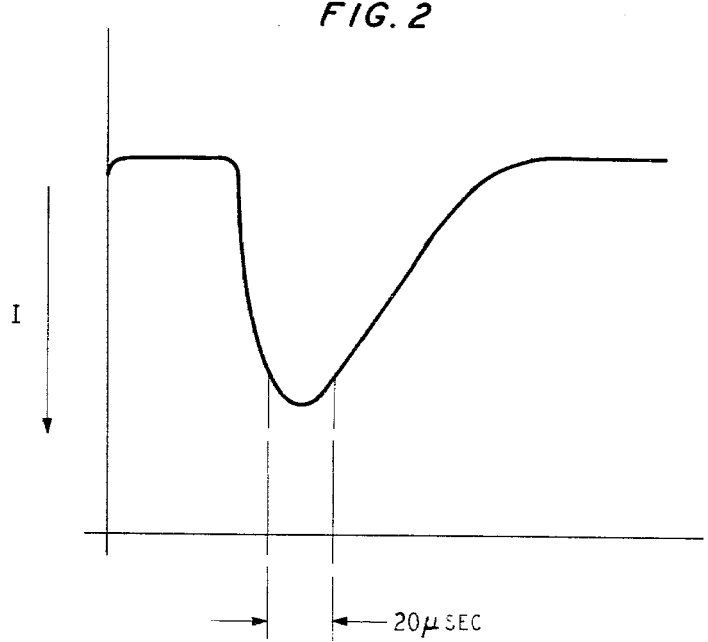
FIG. 2 shows an oscilloscope trace of 1.433 $\mu$m output from a segmented plasma recombination laser in cadmium produced by discharging a 0.01 $\mu$F capacitor initially charged to 18 kV; helium is utilized as a background gas at 3 Torr.

The 1.433 $\mu$m output from a SPER laser in cadmium produced by discharging a 0.01 $\mu$F capacitor initially charged to 18 kV in the presence of helium gas at 3 Torr pressure is shown in FIG. 2. When the rear resonator mirror 150 was removed, no radiation at or near 1.433 $\mu$m due to either spontaneous emission or stimulated emission could be detected. The onset of the 48 $\mu$sec duration laser pulse occurred long, ~40 $\mu$sec, after the 2 $\mu$sec current pulse was over. Delay times as short as 5 $\mu$sec and as long as 100 $\mu$sec have been observed under some conditions. This delay correlated well with the observation of visible spontaneous emission from highly excited levels in neutral cadmium. This delayed spontaneous emission is a characteristic feature of the plasma-recombination process as detailed in an article by applicants entitled, "Recombination Lasers in Expanding CO$_2$ Laser-Produced Plasmas of Argon, Krypton and Xenon", by W. T. Silfvast, L. H. Szeto and O. R. Wood II, *Applied Physics Letters*, Vol. 31, No. 5, Sept. 1, 1977, pp. 334–337.

The peak power of the pulse shown in FIG. 2 was not high because the active length of the device was so short. A brief attempt to measure the energy in this pulse yielded an upper limit of 50$\mu$ Joules. Hence, given a 48 $\mu$sec pulse width, the peak power must have been no more than 1 Watt. However, since the number of atoms produced per pulse was so small, discussed hereinbelow, even if every cadmium atom were initially in the upper laser level and if the resonator could extract all of the stored energy, less than 10$\mu$ Joules would be expected. Therefore, at this time, the relative output power reported in the last column of Table I can only be given in terms of detector output voltage.

The dependence of laser output on helium pressure was found to vary according to the number and size of the gaps between the metal strips. For example, in a segmented plasma recombination laser in cadmium with 1 mm gaps, the optimum helium pressure, keeping the charging voltage constant, for 1 gap was 3 Torr, for 6 gaps was 7 Torr and for 12 gaps was 12 Torr. In this same device, even though the optimum position for the optic axis 160 of the laser resonator in this embodiment was 7 mm above the row of strips, laser oscillation could be observed anywhere in the 3 mm to 10 mm range.

A preliminary life test was conducted on a segmented plasma cadmium laser. The device to be tested was constructed of 1 mm thick by 2 mm wide by 10 mm long strips of cadmium in such a way as to have six 0.5 mm wide gaps. The apparatus was run at full power (0.01 $\mu$F capacitor charged to 21 kV) for 100,000 pulses at 2 pulses/sec with no discernable decrease in output power although the 7 Torr fill of helium gas had to be replaced occasionally.

After 100,000 pulses the device described above was dismantled and the cadmium strips were weighed. It was found that 2.1 mg per gap of cadmium had been lost during the test. This corresponds to a loss of approximately $10^{14}$ atoms per gap per pulse. This implies that the initial cadmium density in the gaps is a maximum of $10^{17}$ cm$^{-3}$. At the time of onset of laser oscillation, after the volume expansion has taken place, the cadmium density has dropped to less than $10^{14}$ cm$^{-3}$. This, when taken together with the observation of a large delay time between the current pulse and the onset of laser oscillation and the observation of laser action only on transitions that occur across energy gaps in the excited states of the neutral, makes a strong case for a population inversion mechanism based on the following plasma-recombination process: A large fraction of the cadmium atoms produced in the gaps are thought to appear initially as ions. During the volume expansion (from 1 mm$^3$ to $10^3$ mm$^3$) plasma electrons are cooled via collisions with helium gas and as a consequence the electron-ion recombination rate is significantly increased. Because of the high electron densities present, as the cadmium ions recombine with free plasma electrons, they move downward through the high-lying neutral levels by electron collisions with other free electrons until a sufficiently large energy gap is reached. Population builds up at this bottleneck and an inversion is created with respect to lower lying levels. The resulting laser has the potential for high efficiency since all of the excitation is concentrated at the upper laser level.

Extension of this same concept to produce laser action in other elements is possible, as is the scaling in active length and volume. For example, by placing a second segmented plasma device parallel to but 12 mm above the first (positioned so that the plasma expand toward one another) the power output of a segmented plasma cadmium laser at 1.433 $\mu$m was increased by more than a factor of 5. Or, by placing one 5.5 mm high glass plate on each side of a row of cadmium strips to provide some plasma confinement, the power output from a segmented plasma cadmium laser at 1.433 $\mu$m was increased by a factor of 4. In addition, it was found that increasing the number of gaps in a Cd SPER laser from 6 to 46, while keeping the input energy constant, significantly increased its gain and power output.

TABLE I

| ELEMENT | WAVELENGTH ($\mu$m) | TRANSITION | ASSIGNMENT | POWER OUTPUT (mV) |
|---|---|---|---|---|
| Ag | 1.840 | $4f\ ^2F_{5/2}^o$ | $-5d\ ^2D_{5/2}$ | 0.4 |
| C | 0.941 | $3p\ ^1D_2$ | $-3s\ ^1P_1^o$ | 10 |
|  | 1.454 | $3p\ ^1P_1$ | $-3s\ ^1P_1^o$ | 15 |
| Cd | 1.398 | $6p\ ^3P_2^o$ | $-6s\ ^3S_1$ |  |
|  | 1.433 | $6p\ ^3P_1^o$ | $-6s\ ^3S_1$ | 55 |
|  | 1.448 | $6p\ ^3P_o^o$ | $-6s\ ^3S_1$ |  |
|  | 1.640 | $4f\ ^3F^o$ | $-5d\ ^3D_1$ | 18 |
| In | 1.343 | $6p\ ^2P_{\frac{1}{2}}^o$ | $-6s\ ^2S_{\frac{1}{2}}$ | 1.5 |
|  | 1.432 | $6d\ ^2D_{5/2}$ | $-6p\ ^2P_{3/2}^o$ | 15 |
|  | 1.442 | $6d\ ^2D_{3/2}$ | $-6p\ ^2P_{\frac{1}{2}}^o$ | 15 |
| Mg | 1.500 | $4p\ ^3P_2^o$ | $-4s\ ^3S_1$ | 15 |
| Pb | 1.308 | $7d\ ^3F_3^o$ | $-7p\ ^3D_2$ | 14 |
|  |  | or $7p\ ^3P_1$ | $-7s\ ^3P_1^o$ |  |
|  | 1.532 | $5f\ ^3F_2$ | $-6d\ ^3F_3^o$ | 4 |
|  |  | or $8s\ ^1P_1^o$ | $-7p\ ^3P_1$ |  |
| Sn | 1.357 | $6p\ ^1P_1$ | $-6s\ ^1P_1$ | 10 |
| Zn | 1.308 | $5p\ ^3P_2^o$ | $-5s\ ^3S_1$ | 2.5 |
|  | 1.318 | $5p\ ^3P_1^o$ | $-5s\ ^3S_1$ | 5 |

We claim:
1. A recombination laser comprising:
 a resonant laser cavity (150, 151) containing a laser medium and energy abstracting means;
 excitation means (130) for producing said laser medium in said resonant laser cavity;
 characterized in that
 said excitation means comprises at least two conductor strips (101–110) having at least one gap, which at least one gap provides at least one intervening discharge path; and
 means for applying a high-voltage, high-current pulse to said at least two conductor strips;
 said at least two conductor strips are fabricated from a material which is converted into a plasma as a result of the application of said high-voltage, high-current pulse, which plasma cools and recombines to form said laser medium.
2. The recombination laser as defined in claim 1 which further includes a background buffer gas.
3. The recombination laser as defined in claim 2 wherein said background buffer gas is helium.
4. The recombination laser as defined in claim 3 wherein said conductor strips comprises silver.
5. The recombination laser as defined in claim 3 wherein said conductor strips comprises cadmium.
6. The recombination laser as defined in claim 3 wherein said conductor strips comprises carbon.
7. The recombination laser as defined in claim 3 wherein said conductor strips comprises indium.
8. The recombination laser as defined in claim 3 wherein said conductor strips comprises magnesium.
9. The recombination laser as defined in claim 3 wherein said conductor strips comprises lead.
10. The recombination laser as defined in claim 3 wherein said conductor strips comprises tin.
11. The recombination laser as defined in claim 3 wherein said conductor strips comprises zinc.

* * * * *